Patented Sept. 15, 1953

2,652,374

UNITED STATES PATENT OFFICE 2,652,374

WATER RESISTANT PAPER COATINGS AND METHOD OF MAKING SAME FROM UREA-FORMALDEHYDE, AMMONIUM METAPHOSPHATE, AMYLACEOUS MATERIAL, AND CLAY

Ralph N. Thompson, Mount Lebanon Township, Allegheny County, Pa., assignor to Calgon, Incorporated, a corporation of Pennsylvania No Drawing. Application January 31, 1951, Serial No. 208,840

7 Claims. (Cl. 260—17.3)

This invention relates in general to improved paper coatings of the water resistant type and in particular to coatings which have an unusually low viscosity thereby enabling the user to handle them more readily, achieve a more uniform coating, and obtain other benefits which will become apparent upon a further inspection of the description which follows.

During the Second World War it became necessary to coat paper and paperboard with coatings containing casein substitutes as casein was in very short supply as a result of the heavy demand for skim milk which is the source of casein. In order to achieve a degree of water resistance equivalent to casein, starch and various resins were combined by means of various catalysts to form water resistant coating. These casein substitutes have been widely accepted and are once again in demand as the supply of casein for industrial use is again diminishing.

Although numerous articles have been published on the subject, Technical Bulletins 10-A and 19 published by American Cyanamid Company, and an article appearing at page 45 of Paper Trade Journal, June 12, 1947, deal with the subject in considerable detail and outline in general the recommended procedures wherein certain synthetic resins are combined with starches, clays, and coloring materials, if needed, and the copolymerization of the starch and resins is achieved by the addition of a catalyst followed by the application of heat during the drying of the coating.

Unfortunately the usual acid-reacting catalysts employed to copolymerize the starch and resins cause serious and undesirable increase in the viscosity of the mixture. Typical catalysts used previous to my discovery have been alum, ammonium chloride, aluminum chloride, monoammonium orthophosphate $(NH_4)H_2PO_4$, and diammonium orthophosphate $(NH_4)_2HPO_4$.

The resins commonly employed in preparing water resistant coatings are the melamine type resins and the ureaformaldehyde type resins. Typical of the commercial materials of these types are Parez 611, a melamine resin made by American Cyanamid Company, Parez 608, a ureaformaldehyde resin of the same company, and Beckamine P364A, a ureaformaldehyde resin of the Reichhold Chemical Company. Other resins of the melamine and ureaformaldehyde type have been used.

The general practice in preparing the water resistant coatings is to use from about 20% to about 25% by weight of starch based on the weight of the coating clay used, from about 15% to about 25% by weight of resin based on the weight of starch and from about 0.05% to about 0.50% of the catalyst based on the wet weight of coating color. By coating color I mean the complete coating mix of clay, starch, and resin in a slurry. The dry clay is made into a slurry with or without a viscosity reducer such as a sodium silicate or a phosphate such as a sodium or ammonium phosphate glass. The resultant slurry is termed a slip by those skilled in the art. To the slip is added the starch dispersion and the resin dispersion either separately or mixed together and when thoroughly mixed and ready for coating use, the catalyst is added. The complete slurry is then applied to the paper or paperboard by suitable coating machines in the usual manner and the paper is dried. During the drying operation the acidic catalyst causes the starch and resin to copolymerize thereby rendering the coating water resistant.

I have found that whereas alum, diammonium orthophosphate, and ammonium chloride cause an almost immediate and substantial increase in the viscosity of the coating slurry, the use of ammonium metaphosphate, $NH_4PO_3$, as a catalyst almost entirely eliminates this difficulty when ureaformaldehyde resins are employed.

The ammonium metaphosphate I have found so useful is a white, finely divided water soluble product, the manufacture of which is described in detail in two applications for United States Letters Patent filed by Owen Rice and bearing Serial Numbers 34,789 (now U. S. Patent No. 2,561,415 issued July 24, 1951) and 67,387, filed on June 23, 1948, and December 27, 1948, respectively.

To determine the efficacy of ammonium metaphosphate I prepared samples of coating mixtures using three different catalysts, ammonium metaphosphate, diammonium orthophosphate, and ammonium chloride. Alum was not used in my tests since viscosity increase of the coating color with this catalyst was found previously to have been so great that the mix was unworkable. A series of six batches was prepared using each of two ureaformaldehyde resins, Beckamine P364A, and Parez 608. The ratio of ingredients was the same in each of the six mixes, i. e.

40% total solids of color
20% starch (based on weight of clay)
20% resin (based on weight of starch)
0.2% catalyst (based on total weight of wet coating)

Translated into metric weight terms these batches contained the following ingredients:

| Material | Grams |
|---|---|
| clay | 200 |
| water | 133 |
| starch | 40 |
| water | 180 |
| resin | 8 |
| water | 25 |
| water added to yield 40% total solids | 282 |
| catalyst | 1.24 |
| water | 2.00 |

Water was used to prepare a dispersion of each of the materials clay, starch, and resin and to dissolve the catalyst. The clay used was SMC coating clay made by Georgia Kaolin Company and the starch was a chlorinated starch Supercote No. 6 made by Stein-Hall Company.

The coating color mixes were prepared in the following manner:

The clay was slipped with 0.3% Calgon brand sodium phosphate glass to 60% total solids. The starch was cooked at 20% total solids and then cooled to 90° F. The starch dispersion was then added to the clay slip and mixed thoroughly. Next the resin and sufficient water to make the final solids of the color 40% were added. The color was then screened, tested for viscosity and pH, and finally the catalyst dissolved in a small quantity of water was added. The viscosity and pH of the color were again measured. Dragouts were then made with a .0015" bird knife. For each batch dragouts were dried at 120° F. for 20 minutes and 250° F. for 5 minutes. After aging for three days the dragouts were tested for pick and wet rub resistance. The results of this series are shown in Table I. For identification, the six batches were as follows:

Batch No. 1—Beckamine P364A+NH4Cl
Batch No. 2—Beckamine P364A+(NH4)2HPO4
Batch No. 3—Beckamine P364A+NH4PO3
Batch No. 4—Parez 608+NH4Cl
Batch No. 5—Parez 608+(NH4)2HPO4
Batch No. 6—Parez 608+NH4PO3 which increase viscosity, is of prime importance. It should be noted that when my catalyst is used with the resins there is no increase in viscosity of the batch on the first test following addition of the catalyst, i. e. at the rate of six (6) R. P. M. of the Brookfield viscosimeter. The value of this catalyst is increasingly apparent as the color ages upon standing since plant practice requires mixing up large batches which often are required to stand over night. The reduced expense achieved by ease in pumping the color through a piping system is obvious. Other advantages will be apparent to those skilled in the art.

Although I have illustrated certain procedures and designated specific ureaformaldehyde resins by brand name, it is to be understood that my catalyst can be used with any ureaformaldehyde resin. Also, it is obvious that the procedure is applicable to other uses of these resins where a slurry is prepared with starches, gums, etc. whether the end use is for paper coating or not, so long as the catalytic effect is desired.

I have designated definite amounts of catalyst, starch, resin, and clay but it should be clearly understood that I may use varying amounts of each ingredient since the ratio of components will vary depending upon the type of paper to be coated, the water supply used to prepare the slurries, and many other factors. Generally speaking, I may use from 0.05% to 0.50% of the ammonium metaphosphate based on the wet weight of coating color with the preferred concentration being about 0.20%.

I claim:

1. A water-resistant paper coating color in the form of an aqueous slurry, the non-aqueous portion of which comprises a clay, an amylaceous material, a ureaformaldehyde resin and ammonium metaphosphate.

2. A water-resistant paper coating color in the form of an aqueous slurry, the non-aqueous portion of which comprises a clay, an amylaceous material, a ureaformaldehyde resin and ammonium metaphosphate, said ammonium metaphosphate being present in an amount by weight

*Table I*

| Batch No | 1 | 2 | 3 | 4 | 5 | 6 |
|---|---|---|---|---|---|---|
| pH before catalyst | 7.50 | 7.50 | 7.50 | 7.45 | 7.45 | 7.45 |
| pH after catalyst | 7.10 | 7.65 | 7.36 | 6.95 | 7.45 | 7.00 |
| Brookfield viscosity before catalyst: | | | | | | |
| 6 R. P. M. | 150 cp | 150 cp | 150 cp | 180 cp | 180 cp | 180 cp |
| 12 R. P. M. | 105 cp | 105 cp | 105 cp | 150 cp | 150 cp | 150 cp |
| 30 R. P. M. | 85 cp | 85 cp | 85 cp | 100 cp | 100 cp | 100 cp |
| 60 R. P. M. | 75 cp | 75 cp | 75 cp | 83 cp | 83 cp | 83 cp |
| Brookfield viscosity immediately after catalyst: | | | | | | |
| 6 R. P. M. | 300 cp | 225 cp | 150 cp | 550 cp | 250 cp | 150 cp |
| 12 R. P. M. | 200 cp | 162 cp | 112 cp | 400 cp | 175 cp | 112 cp |
| 30 R. P. M. | 140 cp | 110 cp | 80 cp | 250 cp | 115 cp | 90 cp |
| 60 R. P. M. | 100 cp | 80 cp | 66 cp | 175 cp | 88 cp | 88 cp |
| Brookfield viscosity after standing for 18 hours: | | | | | | |
| 6 R. P. M. | 975 cp | 600 cp | 380 cp | 1,700 cp | 750 cp | 525 cp |
| 12 R. P. M. | 625 cp | 400 cp | 275 cp | 1,050 cp | 500 cp | 350 cp |
| 30 R. P. M. | 350 cp | 250 cp | 175 cp | 550 cp | 300 cp | 215 cp |
| 60 R. P. M. | 210 cp | 175 cp | 130 cp | 375 cp | 195 cp | 155 cp |
| Wax tests (TAPPI standard T459-M-48 July 1948): | | | | | | |
| Dried at 250° F | 8 | 8 | 8 | 8 | 8 | 8 |
| Dried at 120° F | 6+ | 7 | 8 | 6+ | 6+ | 7 |
| Wet rub resistance:[1] | | | | | | |
| Dried at 120° F | Poor | Poor | Poor | Poor | Poor | Poor |
| Dried at 250° F | Good | Good | Good | Good | Good | Good |

[1] After 3 days' time (as described in article at page 45, Paper Trade Journal, June 12, 1947).

Since viscosity of the coating color is one of the most significant physical properties to be reckoned with by the user of the color, the fact that the ammonium metaphosphate as a catalyst of ureaformaldehyde resins actually reduces or at worst has no significant effect upon viscosity, as contrasted with the usual catalysts which is between about 0.05% and about 0.5% of the weight of the aqueous slurry.

3. A method of preparing a non-thickening coating color for use in the manufacture of water-resistant coated paper and paperboard which comprises mixing an aqueous slurry the solid portion of which consists principally of a clay, a ureaformaldehyde resin, and an amylaceous material, adding thereto a sufficient amount of water soluble ammonium metaphosphate catalyst to effect the copolymerization of the resin and the starch after applying the coating color to form a coating on paper and dehydrating said coating in situ, said method being characterized by the fact that the addition of said ammonium metaphosphate catalyst produces no thickening of the aqueous slurry.

4. The method as described in claim 3 where the amount by weight of ammonium metaphosphate added to the slurry is from about 0.05% to about 0.5% of the weight of the slurry.

5. An aqueous, non-thickening coating color for use in preparing water-resistant coatings for paper and paperboard, the non-aqueous portion of which comprises about 100 parts of clay, about 20 parts of starch, about 4 parts of a ureaformaldehyde resin and about six-tenths part of ammonium metaphosphate, and sufficient water to yield a coating color of the desired total solids content.

6. An aqueous, non-thickening coating color for use in preparing water-resistant coatings for paper and paperboard, the non-aqueous portion of which comprises about 100 parts of clay, about 15 to about 25 parts of starch, about 3 to about 5 parts of a ureaformaldehyde resin and from about fifteen-hundreds part to about one and one half parts of ammonium metaphosphate, and sufficient water to yield a coating color of the desired total solids content.

7. A water-resistant paper coating color in the form of an aqueous slurry the non-aqueous portion of which comprises a clay, an amylaceous material, a ureaformaldehyde resin and ammonium metaphosphate polymerization catalyst, said color being characterized by the fact that no substantial increase in viscosity of the color occurs upon the addition of the catalyst thereto.

RALPH N. THOMPSON.

References Cited in the file of this patent

UNITED STATES PATENTS

| Number | Name | Date |
|---|---|---|
| 2,399,489 | Landes | Apr. 30, 1946 |
| 2,471,743 | Harrison | May 31, 1949 |

OTHER REFERENCES

Hackh's Chemical Dictionary, 3rd edition, page 46, The Blakiston Co., Philadelphia (1944).